United States Patent [19]
Oh

[11] Patent Number: 4,787,647
[45] Date of Patent: Nov. 29, 1988

[54] FOUR WHEEL CYCLE

[76] Inventor: Myoun-Keon Oh, No. 9-85, Dukeon-ri, Sindo-eop Kyounggi-do, Rep. of Korea

[21] Appl. No.: 933,752

[22] Filed: Nov. 21, 1986

[30] Foreign Application Priority Data

Nov. 26, 1985 [KR] Rep. of Korea ............... 1985/15581

[51] Int. Cl.4 ............................................. B62K 21/00
[52] U.S. Cl. .................................. 280/240; 280/263; 280/267
[58] Field of Search ............... 280/240, 263, 210, 267, 280/259, 282; 211/182; 248/431

[56] References Cited

U.S. PATENT DOCUMENTS

| | | | |
|---|---|---|---|
| 1,585,832 | 5/1926 | Doud | 280/267 X |
| 1,590,057 | 6/1926 | Raasch | 280/267 |
| 2,402,297 | 6/1946 | Rumsey | 280/263 X |
| 2,823,088 | 2/1958 | Herrschaft | 248/431 X |
| 2,965,186 | 12/1960 | Burns, Jr. | 280/282 X |
| 3,768,834 | 10/1973 | Singleton | 280/209 |
| 3,836,175 | 9/1974 | Pomerance et al. | 280/209 |
| 3,865,401 | 2/1975 | Kingsly | 280/209 |
| 3,902,738 | 9/1975 | Gandrud | 280/209 |
| 3,938,827 | 2/1976 | Johnson | 280/209 |
| 4,290,620 | 9/1981 | Ghika | 280/209 |
| 4,524,987 | 6/1985 | Kim | 280/204 |

Primary Examiner—James T. McCall
Attorney, Agent, or Firm—Ladas & Parry

[57] ABSTRACT

A four wheel cycle has a seat on a pipe-formed body, two non-steerable front wheels with a foot pedal crank driving mechanism directly therebetween, and two steerable rear wheels with steering mechanism. The steering mechanism has a steering wheel on one end of a steering shaft a, steering arm across the other end of the steering shaft and a pair of steering connecting rods cross connecting the steering arm to the steerable rear wheels.

1 Claim, 1 Drawing Sheet

FOUR WHEEL CYCLE

FIELD OF THE INVENTION

The present invention relates to a four wheel cycle suitable for a baby or young child, a ride thereon and more particularly to a four wheel cycle comprising a body, a seat, two front, driven wheels, and two rear, steerable wheels.

BACKGROUND OF THE INVENTION

In the art, a conventional four wheel cycle has a body structure which is fabricated largely by welding together a steering mechanism with two front wheels and a driving mechanism having two connecting rods between front foot crank pedals and a rear wheel crank, and a seat attached on the body.

Potential problems associated with known four wheel cycles include the complicated body, because they are constructed largely by welding, and the complicated structure of the front wheel steering mechanism and the rear wheel driving mechanism. Furthermore, an important disadvantage of the known art is the instability of the cycle with a rider on it when the cycle is pushed by someone.

Accordingly, it is an object of the present invention to provide a four wheel cycle with a body constructed of pipes by forming and by banding.

Another object of the present invention is to provide a four wheel cycle having a driving mechanism wherein the front wheels are not used for steering the cycle, and which provides greater riding stability.

Still another object of the present invention is to provide a four wheel cycle with a steering mechanism associated with the rear wheels for easier steering.

BRIEF DESCRIPTION OF THE DRAWINGS

The accompanying drawings, wherein like numerals refer to like parts throughout and which are incorporated in and constitute a part of the specification, illustrate an embodiment of the invention and, together with the description, serve to explain the principles of the invention, and wherein.

DETAILED DESCRIPTION OF THE INVENTION

Figure 1:
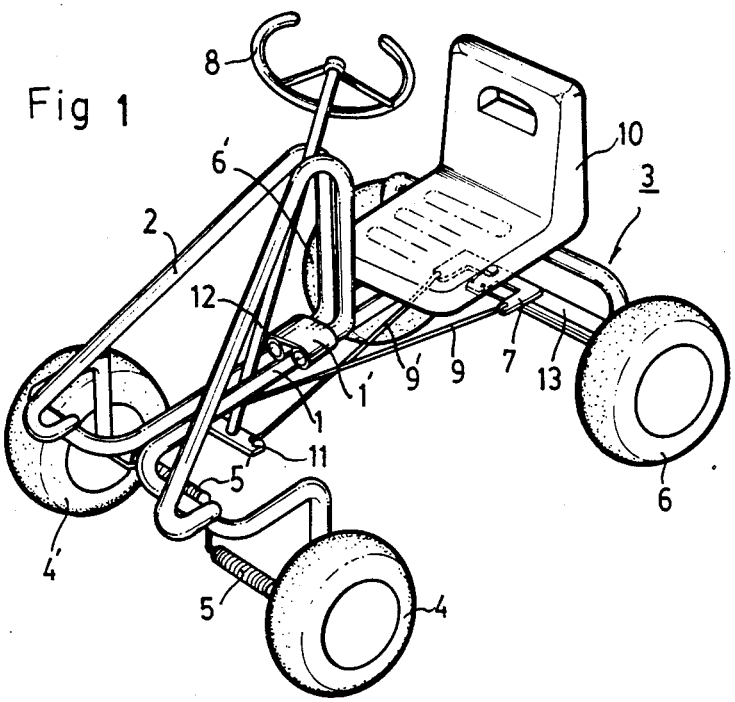
FIG. 1 is a perspective view of the invention.
Figure 2:
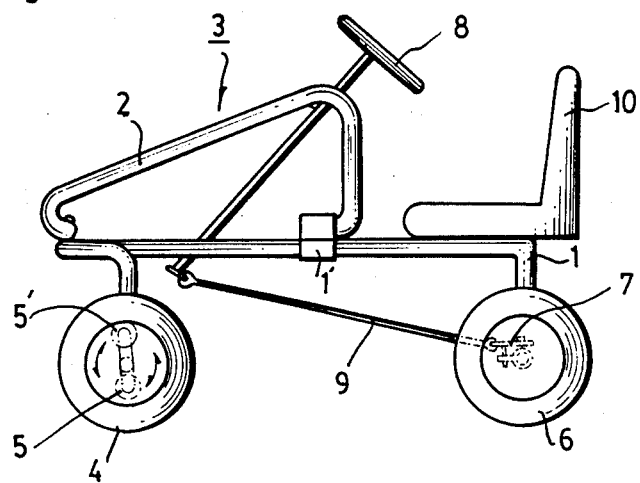
FIG. 2 is a side elevational view of the invention.

Refering now to the drawings, it is seen that a four wheel cycle according to the present invention, as shown in the FIGS. 1 and 2, comprises a body 3 having an "H" shaped frame, formed by pipes and a support frame 2 also formed by pipes. Body 3 and frame 2 are banded together by banding 1'. The ends of the support frame are spot welded to the "H" shaped frame.

The front end of the "H" shaped frame has two front wheels 4,4' rotatably supported non-steerably on opposite sides thereof. The wheels 4,4' are connected directly to foot crank pedals 5,5' which drive the wheels 4,4'.

The rear end of the "H" shaped frames has two rear wheels on opposite sides thereof which are rotatably and steerably supported. A substantially U-shaped steering unit 7 is rotatably attached to the body 3. A steering yoke 13 is connected to the steering unit 7 and between the rear wheels.

At opposite ends of the steering unit 7, steering connecting rods 9,9' are connected to turn the steering unit. The connecting rods 9,9' are crossly connected respectively to opposite ends of the steering arm 11 which is perpendicularly attached to a steering shaft 12 which is rotatably in a tube (not shown in the Figures) attached to the body 3.

At the other end of the steering shaft 12, a steering wheel 8 is connected. Finally, a seat 10 is attached to the body 3.

When a person sits on the seat and turns the steering wheel clockwise, the rear wheels are caused to turn counter-clockwise thereby causing the cycle to turn right while, simultaneously, foot crank pedals 5,5' are driven by the user's feet.

We claim:

1. A four wheel cycle comprising a body 3 having an "H" shaped frame (1) and a support frame (2) banded and spot welded together; a seat (10) on the body; foot crank pedals (5,5'); a pair of front wheels (4,4') rotatably attached non-steerably to a front end of the "H" shaped frame and connected directly to opposite ends of the foot crank pedals; a pair of rear wheels (6,6'); and a steering mechanism comprising a steering wheel (8), a steering arm (11), a steering shaft rotatably attached to the body with the steering wheel and steering arm fixed at opposite ends, a steering unit (7) and at least one steering yoke (13) rotatably connected between the rear wheels and steerably attached to a rear end of the "H" shaped frame, and steering connecting rods (9,9') crossly connected respectively between opposite ends of the steering arm and unit.

* * * * *